United States Patent Office 2,828,212
Patented Mar. 25, 1958

2,828,212

STABLE DRY CURING SALT COMPOSITIONS

Louis Sair, Evergreen Park, Ill., assignor to The Griffith Laboratories, Inc., Chicago, Ill., a corporation of Illinois No Drawing. Application April 26, 1954
Serial No. 425,725

16 Claims. (Cl. 99—222)

The present invention relates generally to dry curing salt compositions for meat products, and in particular to one containing a form of an ascorbic acid isomer.

It is known that l-ascorbic acid and its optical isomer d-ascorbic acid function advantageously in the curing of meat in the presence of nitric oxide. It is a curing catalyst and a color stabilizer. The nitric oxide derives from nitrous acid which is released from a nitrite salt present during the curing. The nitrite salt is commonly an ingredient of the composition initially provided. However, when the nitrogen curing salt is provided only as the nitrate, it is reduced in the first stages of the cure to nitrite or nitrous acid. Curing compositions in common use include both nitrite and nitrate salts, the former to act initially and the latter to be reduced for continuing the function of nitric oxide.

The nitric oxide forms nitroso compounds with protein pigments of the blood and the lean of the meat. Reduction is normal by reason of natural enzymes in the meat, and it may be accelerated and enhanced by the presence of an ascorbic acid. The red color is enhanced by heat which converts the pigment to nitrosohemochromogen and nitrosomyochromogen.

The general reactions are known but the precise mechanisms are obscure. At first, the pigments turn gray on reaction with nitrous acid and this is an oxidation giving a ferri-compound described as methemoglobin. Then reduction and red-coloration occur producing a ferro-nitroso-pigment. The presence of an ascorbic acid in the cured product presenting the desirable color of the nitrosohemochromogen and nitrosomyochromogen functions to retard oxidation at the surface exposed to the atmosphere, as when displayed for the purpose of sale. Such oxidation tends to produce green-gray-brown discoloration.

The meat packing industry to a large extent is accustomed to purchasing its curing salt compositions in dry salt form either for dissolution in water for pickling brines, or for direct application to whole meats, or for admixture into ground meats for the production of loaf and encased products. In general, such compositions comprise sodium chloride and nitrogen-containing curing salt selected from the group consisting of alkali metal nitrite and nitrate, usually sodium nitrite and sodium nitrate.

Compositions consisting of the chloride, nitrite and nitrate of sodium are stable, even in the presence of adopted moisture. The addition of an ascorbic acid to such stable compositions leads to rapid loss of nitrite. The addition of sodium ascorbate to such stable compositions, both dry and moist, likewise leads to deterioration, but more gradually, with loss of nitrite and ascorbic values, to such an extent that the compositions are commercially unstable. Because original mixtures so containing sodium ascorbate and having an added 1% of moisture deteriorate much faster than original dry mixtures otherwise the same, it has been theorized that there is hydrolysis of sodium ascorbate which liberates ascorbic acid, which latter attacks the nitrite salt, resulting in loss of nitrite and ascorbic values.

The present invention is based upon the discovery that the addition to such unstable mixtures of a suitable agent of character to repress the hydrolysis of sodium ascorbate, is effective to retard or prevent the deterioration, and preserve the nitrite and ascorbic values over such period of time that the mixtures are commercially stable and saleable for their intended use in the same way as when initially compounded.

The present invention has for its object the provision of commercially saleable solid dry compositions containing nitrite salt and a compound of an ascorbic acid effective as ascorbic acid in the process of curing meat.

It is a particular object of the invention to provide such salt compositions with all the salt ingredients employed in curing meat either by direct contact of the meat with the dry compositions, or by use of a brine formed from the solid salt composition.

In absolutely dry compositions containing nitrite salt and sodium ascorbate, the stability of nitrite values may be achieved, but in commercial practices absolute dryness is not readily maintained. Moisture content is inevitable, and as a result, compositions containing nitrite salt and ascorbate salt tend to deteriorate on aging.

This is substantiated by the following:

Numerous compositions varying in contents approximately as follows were tested:

| | Percent |
|---|---|
| Sodium chloride | 65 to 91 |
| Sodium nitrite (commercial) | .8 to 6 |
| Sodium nitrate (commercial) | 2.6 to 32.5 |
| Sodium ascorbate | 1 to 14 |

Variance in the content of sodium chloride and of sodium nitrate is of no significance. The commercial nitrite salt employed is 99.5% pure, containing a small amount of stabilizing alkali of little effect in the compositions. In one case, the sodium ascorbate was added to a flash-dried composition of the three inorganic salts, as made by Hall U. S. No. 2,145,417. This product releases moisture so the composition is a moist one. In such a product having initially 5.8% of nitrite salt and 9.6% of sodium ascorbate, the nitrite content was reduced to 4.6% in seven days. This is not commercially saleable.

In other cases the salts were mechanically mixed, and originally dry. In one composition having originally 14.2% sodium ascorbate and 5.81% nitrite, one part was originally moistened by adding 1% of water, and the remainder unmoistened. In seven days the dry sample showed 5.77% nitrite, while the moist one showed 4.55%. The dry one in seven days was substantially unchanged, but at 60 days and at 80 days it was orange in color and showed 4.8% nitrite. The moist one in 80 days was chocolate colored and showed 2.5% nitrite. This formulation, moist or dry, is commercially unstable.

In two cases using small amounts of sodium ascorbate, namely about 1%, and relatively low and high contents of commercial sodium nitrite, in dry mechanical mixtures, the compositions were relatively stable in seven days but unstable after 20 days, as shown in Table I.

TABLE I

| Percent Sodium Ascorbate | Percent Nitrite Content | | | |
|---|---|---|---|---|
| | Original | After 7 days | After x days | Percent |
| 1.1 | 4.64 | 4.45 | 25 | 4.25 |
| 1.7 | 0.52 | 0.50 | 20 | 0.38 |

The present invention, therefore, provides solid salt compositions containing curing salts, which are suitably stable in both nitrite values and ascorbic values, for commercial sale as a commodity, and therefore "commercially stable" as that term is contemplated herein.

A water-soluble salt of the selected ascorbic acid is used, preferably alkali metal salt. The sodium salts of d-ascorbic acid and of l-ascorbic acid are interchangeable in the present invention. Accordingly, where the present description refers to ascorbic acid, or to an ascorbic acid, or to sodium ascorbate, it is to be understood that it exemplifies any one or both of the two isomers and the alkali metal salts thereof. The l-isomer is vitamin C. The d-isomer is about one-twentieth as potent as a vitamin, and hence is preferred to avoid "medication."

Ascorbic acid in solution has a pH of 2.5. Sodium ascorbate in solution has a variable pH. According to the Merck Index, 6th edition, 1952, the pH of sodium ascorbate solution varies from 5.5 to 5.9, while the U. S. P. specification for pH is from 5.6 to 7.0. These variations are explained by the hydrolysis of sodium ascorbate so that the pH may be varied by slight changes in the ratio between the sodium ion and the ascorbate radical.

Sodium ascorbate may be made in numerous ways, one being described in Holland U. S. No. 2,442,005. The present disclosure relates to a sodium ascorbate which when dissolved in water as a 5% solution has a pH of 6.8 to 6.9, meeting the U. S. P. specification just short of neutral pH of 7. It is employed herein as a dry solid salt.

For indicating the effect of this difference in pH, two compositions have been made originally as dry salt compositions and tested for their nitrite stability as shown in Table II.

TABLE II (Parts By Weight)

C. P. and commercial nitrogen-salts

|  | Composition A— C. P. | Composition B— Commercial |
|---|---|---|
| Fine Flake Sodium Chloride | 92.56 | 92.56 |
| Sodium ascorbate | 1.04 | 1.04 |
| Sodium nitrite | 4.00 | 4.00 |
| Sodium nitrate | 2.40 | 2.40 |
| Ph* | 6.2 | 7.5 |
| Storage at room temperature: |  |  |
| Percent Sodium nitrite—Original | 4.0 | 4.0 |
| Percent Sodium nitrite—After 2 days | 3.7 | 3.9 |
| Percent Sodium nitrite—After 6 days | 3.5 | 3.6 |

*pH values reported in this specification are obtained in a 1% solution in water using a Beckman pH meter with glass electrode. The results may be in error by about .05.

Both preparations were yellowing and because of the evident loss of nitrite, compositions A and B are not stable for commercial sale. A period of at least 6 days is hereby contemplated as the minimum period for commercial stability, to allow preparation by a manufacturer, shipment, and slight delay before use after delivery. Accordingly, compositions A and B are useful products, only if used promptly after compounding. Table II shows that the amount of alkali resulting from use of commercial nitrite salt is not sufficient to stabilize the nitrite even though the pH is as high as 7.5, at which one would suspect the hydrolysis of sodium ascorbate to be repressed.

In developing this invention, it has been found generally that loss of nitrite in the presence of sodium ascorbate is lessened as the pH is made higher, especially in the case where easily soluble alkaline agents are employed. Upwardly from pH of 7.6 the nitrite value becomes suitably stable for commercial sale. By the inclusion of an appreciable quantity of alkaline agent in combination with sodium ascorbate, the desired preservation of nitrite value may be achieved.

Table III shows the varying usages of several alkaline salts in a mechanically mixed curing salt composition No. 1 as follows:

| | Parts by weight |
|---|---|
| Sodium chloride | 77.4 |
| Sodium nitrite (commercial) | 6.8 |
| Sodium nitrate (commercial) | 4.55 |
| Sodium ascorbate | 10.6 |
| Alkaline salt | 14.2 |

In Table III, the pH values of the original mixtures are given, the nitrite content after two months storage, the original value being 6%, and the present loss of nitrite salt.

TABLE III

| Composition No. | Alkaline Salt | Original pH | Nitrite Content After 2 Months | Percent Loss of Nitrite Salt |
|---|---|---|---|---|
| 1a | None | 7.4 | 5.47 | 8.5 |
| 1b | Sodium Carbonate | 10.05 | 5.90 | 1.6 |
| 1c | Trisodium Phosphate (1H₂O) | 10.3 | 5.79 | 3.3 |
| 1d | Disodium Phosphate | 8.45 | 5.60 | 6.7 |
| 1e | Tetrasodium Pyrophosphate | 7.63 | 5.60 | 6.7 |
| 1f | Sodium Tripolyphosphate | 8.05 | 5.70 | 5.0 |
| 1g | Sodium Bicarbonate | 7.65 | 5.82 | 3.0 |

In Table III the amount of alkaline agent added exceeds the amount of sodium ascorbate present. It is noted that the compositions using sodium carbonate, sodium bicarbonate and trisodium phosphate are the three best ones, and that the order of best stability with respect to nitrite does not parallel the increase in pH. The disodium phosphate, tetrasodium pyrophosphate and sodium tripolyphosphate, compared with the trisodium phosphate and the sodium carbonates, are not so readily soluble and are ionized to less degrees, with the result that for the amount of moisture (unknown and variable) collected by the compositions in two months, there is less of the alkaline agent in the solution to ionize and raise the pH. Nevertheless, there is a reserve present which is an important consideration.

The protection offered by alkaline materials to impart a pH of at least 7.6 is effective not only in dry compositions but in moist ones. This is an important feature in the case of curing compositions in which the nitrite and nitrate salts are housed within sodium chloride crystals. Such products are formed by flash drying a solution on a hot roll. It is well known that the resulting crystals trap a small quantity of water, and on standing become more stable by releasing the trapped water. This is one cause of caking of such product to avoid which the hygroscopic partitioning agent is employed.

Such corrected compositions containing also the sodium ascorbate and a suitable quantity of an alkaline material, whether or not one or both are included in the solution dried on the roll, may be stabilized in spite of the moisture content.

The following Table IV shows the stability of compositions with and without moisture content. A mechanical mixture No. 2 contains:

| | Parts by weight |
|---|---|
| Sodium chloride | 86.3 |
| Sodium nitrite (commercial) | 6.8 |
| Sodium nitrate (commercial) | 4.55 |
| Sodium ascorbate | 16 |

The composition has an original content of nitrite salt of 6%. The table shows the grams of sodium carbonate added to 4 ounces of composition No. 2, the moisture content of the composition as originally made, the nitrite content after 12 weeks storage, the percent loss of original nitrite value, and the final color.

TABLE IV

| Composition | Grams Soda Ash | Percent Loss In Nitrite Content | | Final Color | |
| --- | --- | --- | --- | --- | --- |
| | | Dry | Moist, 1% | Dry | Moist, 1% |
| 2a | 0 | 20 | 57 | Orange | Chocolate. |
| 2b | 7.1 | 8.2 | 11.5 | White | Yellow. |
| 2c | 14.2 | 5.0 | 5.0 | ---do----- | Ivory. |
| 2d | 28.4 | 1.7 | 2.5 | ---do----- | Light Ivory. |

In Table IV, compositions 2a and 2b indicate that the more moist specimen of each loses more nitrite than a like mixture without the added 1% of moisture as originally made. As the amount of soda ash increases, the loss from the moist condition is less and more nearly approaches that of the dry samples. In particular, it is noted that the same benefit appears from the reported colors of the final product. The three dry compositions containing the soda ash remain white, while the corresponding moistened compositions are lighter in their colored condition as the amount of alkaline agent is increased.

In my copending application, Serial No. 269,939, now abandoned, certain four-day stable pickling brines are given containing sodium salt of d-ascorbic acid at pH values varying from 6.5 to 9.6. Pickling brines are more stable at lower pH values in their nitrite content than are the solid contents thereof in dry solid composition form. The brines so disclosed of which the solid contents may be provided as stable dry solid compositions may be constituted by the compositions Nos. 3 to 6 of which the general formula is:

| | Parts by weight |
| --- | --- |
| Sodium chloride | 80 |
| Cane sugar | 15 |
| Sodium nitrite (commercial) | .825 |
| Sodium nitrate (commercial) | .55 |
| Sodium ascorbate (as d-isoascorbic acid) | 1.72 |
| Alkaline agent (including the sodium of the sodium ascorbate) | x |

Table V gives the pH values of pickling brines for the above compositions using 394 parts of water, wherein "x" varies in kind and amount as given in the table.

TABLE V

| Composition No. | x | | pH |
| --- | --- | --- | --- |
| | Kind | Amount | |
| 3 | Sodium Carbonate | 5 | 9.5 |
| 4 | ---do--- | 6.87 | 9.6 |
| 5 | ---do--- | 1.72 | 8.6 |
| 6 | ---do--- | 1.29 | 8.25 |

The compositions of Table V may be employed in various ways. Although they are intended for making brines, use of them is not limited thereto. As brine-forming solid compositions, to be commercially sold, they must have a stability for their solid composition form regardless of the requirements of brine. As indicated above, the pH need not be as high as given in Table V, and may be lower than the critical value of pH 7.6 where the composition is freshly made and is dissolved before a deteriorating storage to form brine.

The invention is limited to alkalizing the compositions with alkaline material, preferably alkaline salts, to secure pH values upwardly from 7.6.

The range of pH values for the present invention is upwardly from pH of 7.6 to comprehend within this range the stabilization of dry and moist compositions containing nitrite and a sodium ascorbate.

Sodium chloride is commonly an ingredient in processing meat, and especially bacon, but it may be omitted in dietary products. For example, special meats are prepared which contain less sodium than conventional products for those who are on a low-sodium diet. The following represents a suitable curing salt composition for low-sodium bacon.

Composition No. 7:
- Granulated cane sugar _____ lbs __ 3
- Potassium nitrate _____ oz __ 4
- Potassium nitrite _____ oz __ 1
- Sodium ascorbate _____ oz __ 0.5
- Potassium carbonate _____ oz __ 5
- pH (1% solution) 10.5.

This is used as a dry cure in amount from 3 to 4 pounds per 100 pounds of pork bellies, preferably by sprinkling the dry composition over the flat tops of chilled bellies, previously provided with artificial pores from the tops inwardly, by the insertion and withdrawal of pins.

Although the preferred salts for all of the minor components, especially the nitrite, nitrate, ascorbate and alkaline agent, are disclosed as sodium salts, it is to be understood that this is only the preferred alkali metal. Potassium nitrite and nitrate are well known as ingredients of meat-curing compositions. The potassium may as well be provided as the ascorbate salt or as the alkaline agent, or both, without departing from the spirit and scope of the invention.

In the meat-curing trade, a wide variety of formulations are employed, some within federal regulations and some outside thereof. For example, for the dry-salt cure of bacon, the U. S. regulations impose maximum limits per 100 lbs. of bellies of one ounce of sodium nitrite and in cornbeef pickle maximum limits per 100 gallons of pickle of two pounds of sodium nitrite. However, in many instances, less nitrite is used, commonly in the case of bacon, 70% of said limit, and frequently as little as .5 ounce per 100 lbs. of bellies. In the curing of meat, the ascorbic acid functions not only with respect to the nitrite of the original composition, but also with respect to the subsquently reduced nitrate of the original composition. In the present invention, which concerns the stability of the nitrite salt in the initial compositions prior to application to meat, or prior to modification for such use, the ascorbic compound is functionally related only to the original nitrite content. Because ascorbic content is beneficial, rather than necessary, its content may vary upwardly from zero. When any amount, however small, is present, it necessitates control of the pH. The amount of ascorbic content is predetermined by the particular cure at hand involving nitrogen-containing curing salt selected from the group consisting of alkali-metal nitrite and nitrate including essentially the nitrite salt.

The foregoing circumstances establish that the present invention is not limited to or by any particular ratio between nitrite and ascorbic values, but concerns compositions as described containing both nitrite and ascorbic values, in ratio predetermined by other factors.

Numerous changes and modifications are contemplated as falling within the scope of the appended claims.

I claim:

1. A solid salt composition for use in curing meats consisting essentially of (1) sodium chloride, (2) alkali metal nitrite, (3) alkali metal salt of an isomer of ascorbic acid, and (4) alkaline material in kind and quantity to impart to the composition when dissolved in water at 1% solution by weight a pH of at least 7.6, whereby said composition on taking on moisture remains substantially stable in its nitrite value.

2. A solid salt composition for use in curing meats consisting essentially of (1) sodium chloride, (2) alkali metal nitrite, (3) alkali metal salt of an isomer of ascorbic acid, and (4) a carbonate of alkali metal in kind and quantity to impart to the composition when dissolved in water at 1% solution by weight a pH of at least 7.6, whereby said composition on taking on moisture remains substantially stable in its nitrite value.

3. A solid salt composition for use in curing meats consisting essentially of (1) sodium chloride, (2) alkali metal nitrite, (3) alkali metal salt of an isomer of ascorbic acid, and (4) alkaline alkali metal phosphate in kind and quantity to impart to the composition when dissolved in water at 1% solution by weight a pH of at least 7.6, whereby said composition on taking on moisture remains substantially stable in its nitrite value.

4. A solid salt composition for use in curing meats consisting essentially of (1) sodium chloride, (2) alkali metal nitrite, (3) alkali metal salt of an isomer of ascorbic acid, and (4) alkaline alkali metal polyphosphate in kind and quantity to impart to the composition when dissolved in water at 1% solution by weight a pH of at least 7.6, whereby said composition on taking on moisture remains substantially stable in its nitrite value.

5. A solid composition for use in curing meats comprising essentially alkali metal nitrite, water-soluble salt of an isomer of ascorbic acid, and alkaline material in kind and quantity to impart to the composition when dissolved in water at 1% solution by weight a pH of at least 7.6, whereby said composition on taking on moisture remains substantially stable in its nitrite value.

6. A solid composition for use in curing meats comprising essentially alkali metal nitrite, water-soluble salt of an isomer of ascorbic acid, and a carbonate of alkali metal in kind and quantity to impart to the composition when dissolved in water at 1% solution by weight a pH of at least 7.6, whereby said composition on taking on moisture remains substantially stable in its nitrite value.

7. A solid composition for use in curing meats comprising essentially alkali metal nitrite, water-soluble salt of an isomer of ascorbic acid, and alkaline alkali metal phosphate in kind and quantity to impart to the composition when dissolved in water at 1% solution by weight a pH of at least 7.6, whereby said composition on taking on moisture remains substantially stable in its nitrite value.

8. A solid composition for use in curing meats comprising essentially alkali metal nitrite, water-soluble salt of an isomer of ascorbic acid, and alkaline alkali metal polyphosphate in kind and quantity to impart to the composition when dissolved in water at 1% solution by weight a pH of at least 7.6, whereby said composition on taking on moisture remains substantially stable in its nitrite value.

9. In a solid curing salt composition containing sodium chloride, alkali metal nitrite and alkali metal nitrate, the combination of an alkali metal salt of an isomer of ascorbic acid and alkaline material in kind and in proportion to said ascorbate salt to impart to a 1% solution by weight of the composition a pH of at least 7.6.

10. In a solid curing salt composition containing sodium chloride, alkali metal nitrite and alkali metal nitrate, the combination of an alkali metal salt of an isomer of ascorbic acid and a carbonate of alkali metal in kind and in proportion to said ascorbate salt to impart to a 1% solution by weight of the composition a pH of at least 7.6.

11. In a solid curing salt composition containing sodium chloride, alkali metal nitrite and alkali metal nitrate, the combination of an alkali metal salt of an isomer of ascorbic acid and alkaline alkali metal phosphate in kind and in proportion to said ascorbate salt to impart to a 1% solution by weight of the composition a pH of at least 7.6.

12. In a solid curing salt composition containing sodium chloride, alkali metal nitrite and alkali metal nitrate, the combination of an alkali metal salt of an isomer of ascorbic acid and alkaline alkali metal polyphosphate in kind and in proportion to said ascorbate salt to impart to a 1% solution by weight of the composition a pH of at least 7.6.

13. In a solid curing salt composition containing sugar, alkali metal nitrite and alkali metal nitrate, the combination of an alkali metal salt of an isomer of ascorbic acid and alkaline material in kind and in proportion to said ascorbate salt to impart to a 1% solution by weight of the composition a pH of at least 7.6.

14. In a solid curing salt composition containing sugar, alkali metal nitrite and alkali metal nitrate, the combination of a water-soluble salt of an isomer of ascorbic acid and alkaline material in kind and in proportion to said ascorbate salt to impart to a 1% solution by weight of the composition a pH of at least 7.6.

15. A solid composition according to claim 5 containing sugar.

16. A solid composition according to claim 5 containing sodium chloride and sugar.

References Cited in the file of this patent

UNITED STATES PATENTS

| | | |
|---|---|---|
| 2,145,417 | Hall | Jan. 31, 1939 |
| 2,553,533 | Komarik et al. | May 15, 1951 |
| 2,707,154 | Lehmann et al. | Apr. 26, 1955 |
| 2,739,899 | Hollenbeck | Mar. 27, 1956 |

OTHER REFERENCES

"Food Technology," October 1949, pp. 332 to 336, inclusive, article entitled "Antioxidants in the Hemoglobin Catalyzed Oxidation of Unsaturated Fats."